(12) United States Patent
Vuolle-Apiala et al.

(10) Patent No.: US 9,464,691 B2
(45) Date of Patent: Oct. 11, 2016

(54) ELECTROMECHANICAL DEVICE

(75) Inventors: Tuomas Vuolle-Apiala, Jyväskyla (FI); Jorma Tirkkonen, Jyväskylä (FI); Ville Pakarinen, Jyväskylä (FI); Jari Toikkanen, Muurame (FI); Olli Liukkonen, Lappeenranta (FI); Jorma Mustalahti, Hyvinkää (FI); Ilkka Martikainen, Lappeenranta (FI)

(73) Assignees: The Switch Drive Systems Oy, Lappeenranta (FI); Moventas Gears OY, Jyvaskyla (FI)

( * ) Notice: Subject to any disclaimer, the term of this patent is extended or adjusted under 35 U.S.C. 154(b) by 211 days.

(21) Appl. No.: 13/102,587

(22) Filed: May 6, 2011

(65) Prior Publication Data

US 2011/0272214 A1    Nov. 10, 2011

(30) Foreign Application Priority Data

May 6, 2010 (EP) .................................... 10162074

(51) Int. Cl.
F16H 1/46 (2006.01)

(52) U.S. Cl.
CPC ................ *F16H 1/46* (2013.01); *F03D 15/00* (2016.05); *F03D 80/70* (2016.05); *F05B 2260/98* (2013.01); *Y02E 10/722* (2013.01)

(58) Field of Classification Search
CPC .. F16H 57/04; F16H 57/0401; F16H 57/042; F16H 57/0471
USPC .......................... 475/159, 160, 161, 149, 150
See application file for complete search history.

(56) References Cited

U.S. PATENT DOCUMENTS 2,332,436 A    10/1943  Campbell
2,436,930 A *   3/1948  Mackmann ..................... 310/52
(Continued)

FOREIGN PATENT DOCUMENTS

CN    101426661 A    5/2009
CN    101865084 A    10/2010
(Continued)

OTHER PUBLICATIONS

Office Action issued in co-pending U.S. Appl. No. 13/102,735 on Feb. 16, 2016.
(Continued)

*Primary Examiner* — Robert Hodge
*Assistant Examiner* — Stacey Fluhart
(74) *Attorney, Agent, or Firm* — Birch, Stewart, Kolasch & Birch, LLP

(57) ABSTRACT

An electromechanical device comprises a mechanical interface structure (101) for connecting to an external rotating element, for example a wind turbine. The device comprises an electrical machine (102-104), and one or more gear stages (105-112) on a power transmission path between the mechanical interface structure and a rotor of the electrical machine. The device further comprises mechanical structures (113-115) constituting a common lubricant oil room for both the gear stages and the electrical machine. The electromechanical device comprises oil channels (116*a*) for directing lubricant oil circulated in the device to flow via the gear stages and via bearings (118, 119) of the electrical machine. Therefore, a common lubricating system can be used for both the gear stages and the electrical machine.

20 Claims, 3 Drawing Sheets

(56) References Cited

U.S. PATENT DOCUMENTS

| | | | |
|---|---|---|---|
| 2,998,539 A * | 8/1961 | Bessiere | 310/99 |
| 3,153,158 A | 10/1964 | Schmitter | |
| 3,310,691 A | 3/1967 | Wilkinson | |
| 3,812,928 A * | 5/1974 | Rockwell et al. | 180/65.51 |
| 4,117,359 A | 9/1978 | Wehde | |
| 4,398,110 A | 8/1983 | Flinchbaugh et al. | |
| 4,467,230 A | 8/1984 | Rovinsky | |
| 4,475,075 A | 10/1984 | Munn | |
| 4,505,031 A | 3/1985 | Colwell et al. | |
| 4,531,428 A | 7/1985 | Windish | |
| 4,590,820 A | 5/1986 | Hambric | |
| 4,607,803 A | 8/1986 | Nozawa | |
| 4,922,164 A | 5/1990 | Jacobsen et al. | |
| 4,955,128 A | 9/1990 | Sogabe et al. | |
| 5,053,661 A | 10/1991 | Kitamura et al. | |
| 5,087,229 A | 2/1992 | Hewko et al. | |
| 5,126,582 A | 6/1992 | Sugiyama | |
| 5,246,082 A * | 9/1993 | Alber | 180/65.51 |
| 5,272,938 A | 12/1993 | Hsu et al. | |
| 5,770,904 A | 6/1998 | Rasch et al. | |
| 6,100,615 A * | 8/2000 | Birkestrand | 310/75 C |
| 6,133,659 A | 10/2000 | Rao | |
| 6,278,216 B1 | 8/2001 | Li | |
| 6,515,399 B1 | 2/2003 | Lauf et al. | |
| 6,528,918 B2 | 3/2003 | Paulus-Neues et al. | |
| 6,756,719 B1 | 6/2004 | Chiu | |
| 6,864,607 B2 | 3/2005 | Hashimoto | |
| 6,944,906 B2 | 9/2005 | Moein et al. | |
| 7,057,327 B2 | 6/2006 | Kanazawa et al. | |
| 7,077,776 B2 * | 7/2006 | Sorab et al. | 475/161 |
| 7,228,928 B2 * | 6/2007 | Mizutani et al. | 180/65.51 |
| 7,282,823 B2 | 10/2007 | Hilton | |
| 7,315,099 B2 | 1/2008 | Steffen et al. | |
| 7,564,154 B2 | 7/2009 | Reuter | |
| 7,649,286 B2 | 1/2010 | Manning | |
| 7,815,536 B2 | 10/2010 | Jansen et al. | |
| 2002/0077209 A1 * | 6/2002 | El-Antably et al. | 475/159 |
| 2002/0121819 A1 | 9/2002 | Beatty et al. | |
| 2004/0160058 A1 | 8/2004 | Gott et al. | |
| 2006/0223665 A1 * | 10/2006 | Matsushita et al. | 475/159 |
| 2009/0025991 A1 | 1/2009 | Moriguchi et al. | |
| 2009/0114480 A1 | 5/2009 | Madge et al. | |
| 2010/0007151 A1 | 1/2010 | Ciszak et al. | |
| 2010/0043207 A1 | 2/2010 | Son et al. | |
| 2010/0052442 A1 | 3/2010 | Savant | |
| 2010/0062888 A1 | 3/2010 | Ciszak et al. | |
| 2010/0133854 A1 * | 6/2010 | Jansen et al. | 290/1 C |
| 2010/0164232 A1 | 7/2010 | Siegfriedsen | |
| 2011/0133469 A1 | 6/2011 | Jansen et al. | |

FOREIGN PATENT DOCUMENTS

| | | |
|---|---|---|
| DE | 8513219 U1 | 5/1986 |
| DE | 41 34 553 A1 | 3/1992 |
| DE | 10 2007 012 408 A1 | 9/2008 |
| EP | 0538743 A2 | 4/1993 |
| EP | 0 811 764 A1 | 12/1997 |
| EP | 1 905 633 A1 | 4/2008 |
| EP | 2 088 316 A2 | 8/2009 |
| EP | 2 216 547 A2 | 8/2010 |
| FR | 2824965 A1 | 11/2002 |
| JP | 2009-148035 A | 7/2009 |
| WO | WO 02/095900 A1 | 11/2002 |
| WO | WO 03/031812 A1 | 4/2003 |
| WO | WO 2004/001932 A1 | 12/2003 |
| WO | WO 2005/117242 A1 | 12/2005 |
| WO | WO 2006/115132 A1 | 11/2006 |
| WO | WO 2007/051895 A1 | 5/2007 |
| WO | WO 2011/133024 A2 | 10/2011 |

OTHER PUBLICATIONS

"Camber" Random House Kernerman Webster's College Dictionary, 2010. 2010 K Dictionaries Ltd. Copyright 2005, 1997, 1991 by Random House, Inc., Jun. 13, 2016 (http://www/thefreedictionary.com/camber.

Office Action issued in related U.S. Appl. No. 13/102,735, filed June, 23, 2016.

* cited by examiner

ELECTROMECHANICAL DEVICE

FIELD OF THE INVENTION

The invention relates to an electromechanical device that is a combination of one or more gear stages and a rotating electrical machine.

BACKGROUND

In many power generating systems it may be advantageous from the viewpoints of various design and constructional aspects to connect a generator to a prime mover, e.g. a wind turbine, via a gear-box arranged to convert the rotational speed of the prime mover into a speed range suitable for the generator. Correspondingly, in many motor applications it may be advantageous to connect an electrical motor to an actuator via a gear-box arranged to convert the rotational speed of the electrical motor into a speed range suitable for the actuator. The gear-box may comprise one or more series connected gear stages with the aid of which a desired gear-ratio is achieved. Each single gear stage can be, for example, a planet-gear stage or a cylindrical gear stage.

Challenging design aspects related to a combination of a gear-box and an electrical machine that can be a generator and/or a motor are, among others, the size and weight of the combination. Furthermore, equipment needed for lubricating, cooling, and monitoring the combination of the gear-box and the electrical machine may be complex compared with that of e.g. a gearless system. The reliability of e.g. the lubricating systems may require special attention because, as self-evident, both the lubricating system of the gear-box and the lubricating system of the electrical machine have to simultaneously work properly in order that the combination works properly. Therefore, for obtaining a sufficient effective or combined reliability, the reliabilities of the lubricating systems of the gear-box and of the electrical machine respectively have to be significantly higher than the reliability that would be required for a single lubricating system of a gearless system. However the gear-box, especially in many wind power applications, makes it possible to use an electrical machine that is significantly smaller in dimensions and weight than an electrical machine of a corresponding gearless system. Therefore, the choice whether to use a gear-box or to have a gearless system depends on many different aspects many of which are more or less in trade-off with each other. The gear-box provides many advantages and thus there is a need to provide technical solutions for alleviating or even eliminating the drawbacks related to the use of the gear-box.

Publication US2010052442 discloses a generator system that comprises a generator, a gear train, and a clutch, wherein the clutch is exposed to the gear train. The structure is integrated so that a wall of the housing of the gear train and the clutch constitutes also a wall of the housing of the generator, and in an aperture of this wall there is a lead-through sealing member around the shaft between the gear train and the generator. Thus, the construction is more compact than that of a system comprising separate generator and gear-box which are interconnected with e.g. flanges of their shafts. For example, there is a need for only one lead-through sealing member between the gear train and the generator instead of one in the generator and other in the gear-box.

SUMMARY

In accordance with the present invention, there is provided a new electromechanical device that comprises:

- a mechanical interface structure for connecting to an external rotating element,
- an electrical machine,
- one or more gear stages on a mechanical power transmission path between the mechanical interface structure and a rotor of the electrical machine,
- a rotating coupling for transferring mechanical power between the electrical machine and the one or more gear stages and for allowing misalignment between rotational axes of the rotor of the electrical machine and a shaft of the one of more gear stages connected to the rotating coupling, the electrical machine comprising bearings on one side of the rotating coupling and the one or more gear stages comprising bearings on another side of the rotating coupling,
- mechanical structures constituting a common lubricant oil room for both the one or more gear stages and the electrical machine, and
- oil channels for directing at least a part of lubricant oil circulated in the electromechanical device to flow via the one or more gear stages and at least a part of the lubricant oil to flow via the bearings of the electrical machine, wherein the bearings of the electrical machine comprise every one of the bearings supporting the rotor of the electrical machine.

The above-described electromechanical device is a combination of the electrical machine and the one or more gear stages which are integrated into a single unit and utilize a common lubricating system. Therefore, the lubricating system can be simpler and more reliable than that of a traditional system in which there are a separate gear-box and electrical machine. Furthermore, the size and the weight of the electromechanical device according to the invention can be smaller than those of a traditional combination of an electrical machine and a gear-box.

An electromechanical device according to an advantageous embodiment of the invention further comprises an oil-pump arranged to circulate at least part of the lubricant oil via the one or more gear stages and at least part of the lubricant oil via the bearings of the electrical machine. The manner, how the lubricant oil is divided into the part flowing via the gear stages and into the part flowing via the bearings of the electrical machine, depends on the arrangement of the oil channels. The oil channels may be arranged, for example, in such a manner that the lubricant oil flows first via the gear stages and then via the bearings of the electrical machine, or in such a manner that there are parallel flowing routes for the gear stages and for the electrical machine, or there can be a hybrid of these.

An electromechanical device according to an advantageous embodiment of the invention further comprises an oil cooler element for cooling the part of the lubricant oil circulating via the one or more gear stages and the part of the lubricant oil circulating via the bearings of the electrical machine. The cooler can be used for providing an optimum lubricant oil temperature.

An electromechanical device according to an advantageous embodiment of the invention further comprises a pre-heater element for warming the part of the lubricant oil circulating via the one or more gear stages and the part of the lubricant oil circulating via the bearings of the electrical machine. The pre-heater is used preferably in cold-start situations. From the viewpoint of the life-time of the gears and the bearings, it is advantageous to have an optimum temperature in the lubricant oil also from the beginning of a cold-start process.

An electromechanical device according to an advantageous embodiment of the invention further comprises a filter element for removing impurities from the part of the lubricant oil circulating via the one or more gear stages and from the part of the lubricant oil circulating via the bearings of the electrical machine.

An electromechanical device according to an advantageous embodiment of the invention further comprises a sensor element for monitoring the part of the lubricant oil circulating via the one or more gear stages and the part of the lubricant oil circulating via the bearings of the electrical machine. The sensor element can be responsive to at least one of the following: temperature of the lubricant oil, purity degree of the lubricant oil, water content of the lubricant oil.

A number of further exemplifying embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verb "to comprise" is used in this document as an open limitation that neither excludes nor requires the existence of unrecited features. The features recited in depending claims are mutually freely combinable unless otherwise explicitly stated.

BRIEF DESCRIPTION OF THE FIGURES

The exemplifying embodiments of the invention and their advantages are explained in greater detail below in the sense of examples and with reference to the accompanying drawings, in which.

DESCRIPTION OF THE EMBODIMENTS

Figure 1:
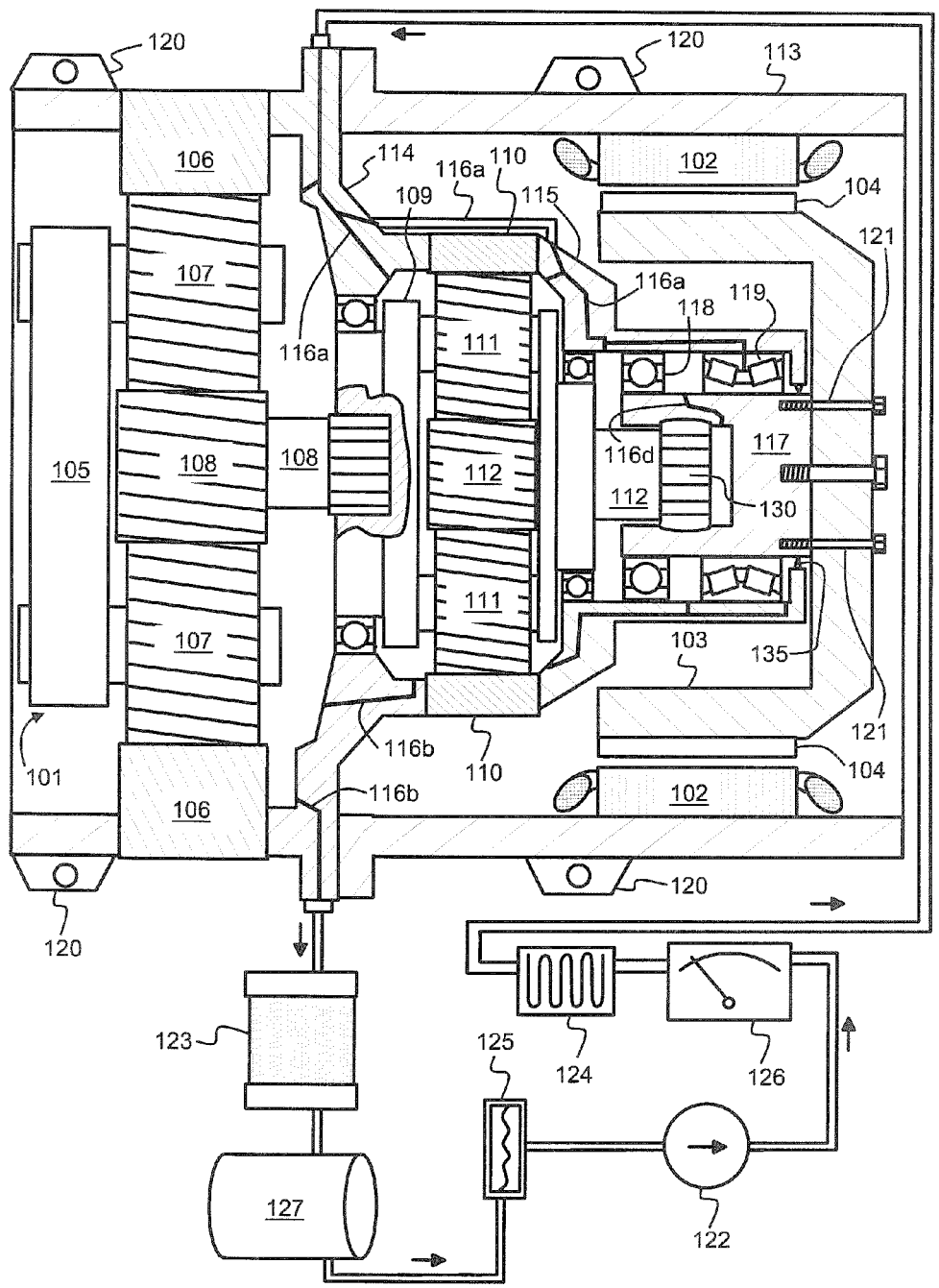
FIG. 1 shows a schematic section view of an electromechanical device according to an embodiment of the invention.

FIG. 1 shows a schematic section view of an electromechanical device according to an advantageous, exemplifying embodiment of the invention. The electromechanical device comprises a mechanical interface structure 101 for connecting to an external rotating element that can be, for example but not necessarily, a wind turbine. The electromechanical device comprises an electrical machine for converting mechanical power into electrical power or vice versa. The electrical machine comprises a laminated stator core 102 that is provided with stator windings. The electrical machine comprises a rotor that includes a central part 117, a frame 103, and permanent magnets 104 mounted on the outer surface of the frame. Naturally, it is also possible that the central part 117 and the frame 103 are a single, monolithic piece. The electromechanical device comprises one or more gear stages on a power transmission path between the mechanical interface structure and the rotor of the electrical machine. The gear stages are arranged to convert the rotational speed of the external rotating element, e.g. a wind turbine, to a speed range suitable for the electrical machine. The electromechanical device comprises first, second, and third mechanical structures 113, 114, and 115 that are arranged to support the elements of the gear-stages and the elements of the electrical machine. The mechanical structures constitute a common lubricant oil room for both the gear stages and the electrical machine. In the electromechanical device, there are oil channels 116a for directing at least a part of lubricant oil circulated in the electromechanical device to flow via the gear stages and at least a part of the lubricant oil to flow via bearings 118 and 119 of the electrical machine. Oil channels 116b are arranged to remove the lubricant oil from the electromechanical device so as to make circulation of the lubricant oil possible. The bearings shown in FIG. 1 are rolling bearings. It should be, however, noted that any of the bearings could be a sliding bearing as well. The manner, how the lubricant oil is divided into the part flowing via the gear stages and into the part flowing via the bearings of the electrical machine, depends on the arrangement of the oil channels. The oil channels may be arranged, for example, in such a manner that the lubricant oil flows first via the gear stages and then via the bearings of the electrical machine, or in such a manner that there are parallel flowing routes for the gear stages and for the electrical machine, or there can be a hybrid of these. The electromechanical device described above and illustrated in FIG. 1 is actually a combination of one or more gear stages and an electrical machine integrated into a single unit and utilizing a common lubricating system. Therefore, the lubricating system can be simpler and more reliable than that of a traditional arrangement in which there are a separate gear-box unit and a separate electrical machine unit connected to each other. Furthermore, the size and the weight of the above-described electromechanical device can be smaller than the size and the weight of the above-mentioned traditional arrangement.

In the electromechanical device according to the exemplifying embodiment of the invention illustrated in FIG. 1, the gear stages consists of a first planet-gear stage and a second planet-gear stage. The first planet-gear stage comprises a planet-wheel carrier 105, a gear ring 106, planet wheels 107, and a sun gear shaft 108. The second planet-gear stage comprises a planet-wheel carrier 109, a gear ring 110, planet wheels 111, and a sun gear shaft 112. The planet-wheel carrier 105 of the first planet-gear stage constitutes a part of the mechanical interface structure 101 arranged to receive the mechanical power from the prime mover. Therefore, the planet-wheel carrier 105 of the first planet-gear stage is rotated by the prime mover. The gear ring 106 is stationary. The sun gear shaft 108 of the first planet-gear stage is connected to the planet-wheel carrier 109 of the second planet-gear stage. Therefore, the planet-wheel carrier 109 of the second planet-gear stage is rotated by the sun gear shaft 108 of the first planet-gear stage. The gear ring 110 is stationary. The sun gear shaft 112 of the second planet-gear stage is connected with a coupling 130 to the central part 117 of the rotor of the electrical machine. The coupling 130 is advantageously cambered so as to allow certain misalignment between the rotational axes of the sun gear shaft 112 and the central part 117 of the rotor of the electrical machine. Thus, the coupling 130 can be arranged to remove the additional loading which would be otherwise caused by the possible misalignment to the bearings 118 and 119. Furthermore, the coupling 130 allows changes in the alignment during operation. The central part 117 of the rotor comprises an oil-channel 116d for delivering lubricant oil to the coupling 130. Therefore, the rotor of the electrical machine is rotated by the sun gear shaft 112 of the second planet-gear stage. The planet gear stages have, preferably but not necessarily, floating sun gear shafts 108 and 112 and cambered couplings between the sun gear shaft 108 and the planet-wheel carrier 109 and the sun gear shaft 112 and the central part 117 in order to provide tolerance against possible mutual deviations between directions of the rotational axes of the sun gear shafts 108 and 112, and of the rotor of the electrical machine, i.e. to provide tolerance against possible alignment non-idealities. In the electromechanical device shown in FIG. 1, the sun gear shaft 112 of the second planet-gear stage is floating on support of the planet-wheels 111 of the second planet-gear stage and on support of the central part 117 of the rotor of the electrical machine. The sun gear shaft 108 of the first planet-gear stage is floating on support of the planet-wheels 107 of the first planet-gear stage and on support of the planet-wheel carrier 109 of the second planet-gear stage. It is, however, also possible that one or both of the sun gear shafts is/are bearing-mounted. In addition to the bearings and the gear stages, the lubrication system lubricates the coupling between the gear stages and the electrical machine, i.e. the coupling between the sun gear shaft 112 and the central part 117.

As can be seen from FIG. 1, the bearings 118 and 119 of the electrical machine support not only the rotor of the electrical machine but also the sun gear shaft 112 of the second planet-gear stage. The coupling 130 is advantageously arranged to deliver the axial forces from the gear stages to the bearings 118 and 119 that are common to the gear stages and the electrical machine. Hence, the bearings 118 and 119 are used for supporting not only the rotor of the electrical machine but also at least partly the second gear stage. Therefore, the number of bearings can be smaller than in a traditional arrangement in which there are a separate electrical machine unit and a separate gear-box unit that are connected to each other. Furthermore, the number of sealed lead-throughs for rotating shafts is reduced compared with the above-mentioned traditional arrangement. A lip seal 135 is arranged to seal the room that constitutes the common lubricant oil room for both the gear stages and the electrical machine.

An electromechanical device according to an embodiment of the invention comprises connection elements 120 on the outer surface of the electromechanical device for attaching to an external mechanical structure. The external mechanical structure can be for example a mounting platform in a machine room at the top of a tower of a wind power plant. The mechanical structures of the electromechanical device comprise a first mechanical structure 113 supporting the stator 102 of the electrical machine with respect to the connection elements, a second mechanical structure 114 supporting the gear ring 110 of the second planet-gear stage with respect to the connection elements, and a third mechanical structure 115 supporting the rotor of the electrical machine with respect to the gear ring of the second planet-gear stage. As can be seen from FIG. 1, the first mechanical structure 113 is arranged to conduct tensions caused by electromagnetic forces acting on the stator 102 of the electrical machine to the connection elements 120 so that the tensions are arranged to bypass the mechanical structures supporting the second gear stage and the rotor. Therefore, the tensions caused by the forces acting on the stator due to e.g. electrical transients are conducted directly from the stator 102 to the connection elements 120 and thereby to the external mechanical structures. The rotor of the electrical machine can be connected to the sun gear shaft 112 of the second planet-gear stage with a safety coupling arranged to lose its grip as a response to a situation in which torque acting over the safety coupling exceeds a pre-determined limit value. With this kind of arrangement it is possible to protect the elements of the gear stages from torque spikes caused by electrical transients that may occur e.g. during a short-circuit situation. The safety coupling may comprise e.g. breaking-pins arranged to break as a response to the situation in which the torque acting over the safety coupling exceeds a pre-determined limit value. FIG. 1 depicts a system in which there are bolts 121 that may be so thin or otherwise weak that these bolts are broken when the torque exceeds the pre-determined limit value. Hence, the bolts 121 represent the above-mentioned breaking-pins. Alternatively, the safety coupling may comprise friction surfaces pressed, e.g. with springs, against each other and arranged to slip with respect to each other as a response to the situation in which the torque acting over the safety coupling exceeds the pre-determined limit value.

As can be seen from FIG. 1, the frame 103 of the rotor has a cupped shape opening towards the gear stages. The mechanical structure 115 supporting the rotor of the electrical machine is arranged to extend to the semi-closed space defined by the cupped shape and the bearings 118 and 119 of the electrical machine are located in the semi-closed space defined by the cupped shape. This allows the bearings 118 and 119 to be located near to the center of mass of the rotor and also shortens the axial length of the electromechanical device. Therefore, the axial length of the electromechanical device shown in FIG. 1 can be smaller than the total axial length of a traditional arrangement in which there are a separate electrical machine unit and a separate gear-box unit that are connected to each other.

Figure 2:
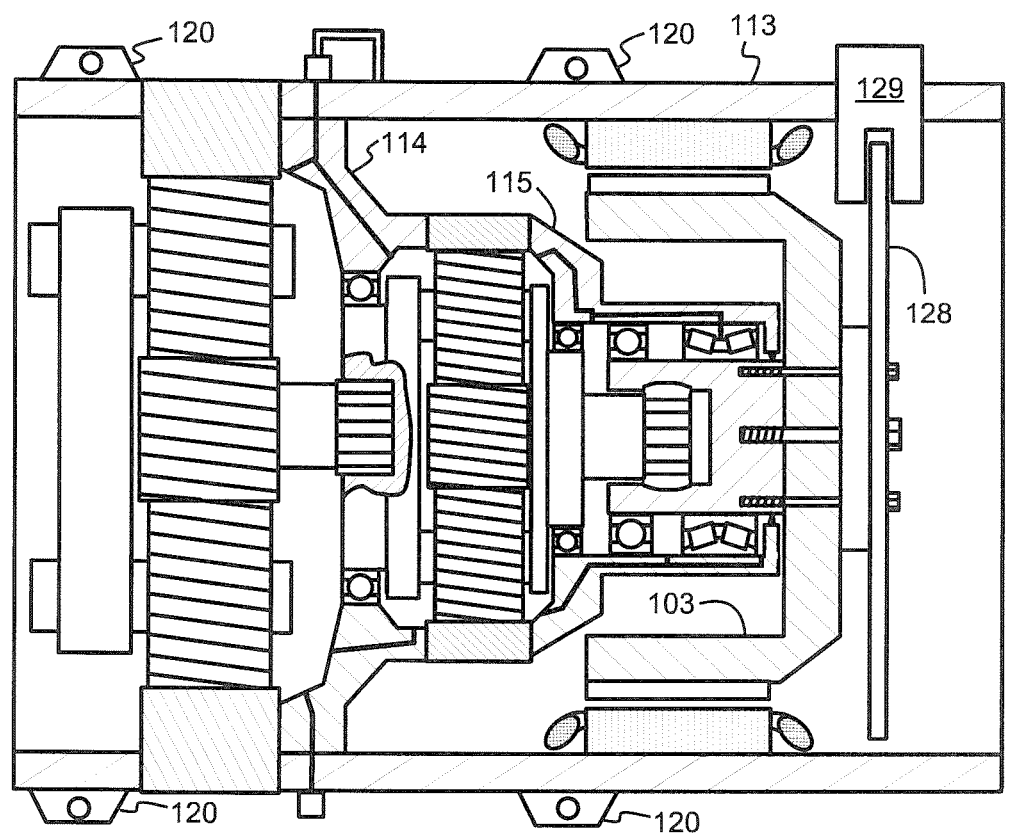
FIG. 2 shows a schematic section view of an electromechanical device according to an embodiment of the invention.

An electromechanical device according to an embodiment of the invention comprises a brake connected to the rotor of the electrical machine, see FIG. 2. The brake can be, for example, a disc-brake in which a brake disc 128 is attached to the frame 103 of the rotor and a brake caliper 129 is attached to the mechanical structure 113. With this kind of arrangement, the braking force is directly conducted to the connection elements 120 and thereby to the external mechanical structures and no breaking force is directed to the mechanical structures 114 and 115 supporting the rotor and the second gear stage.

Figure 3:
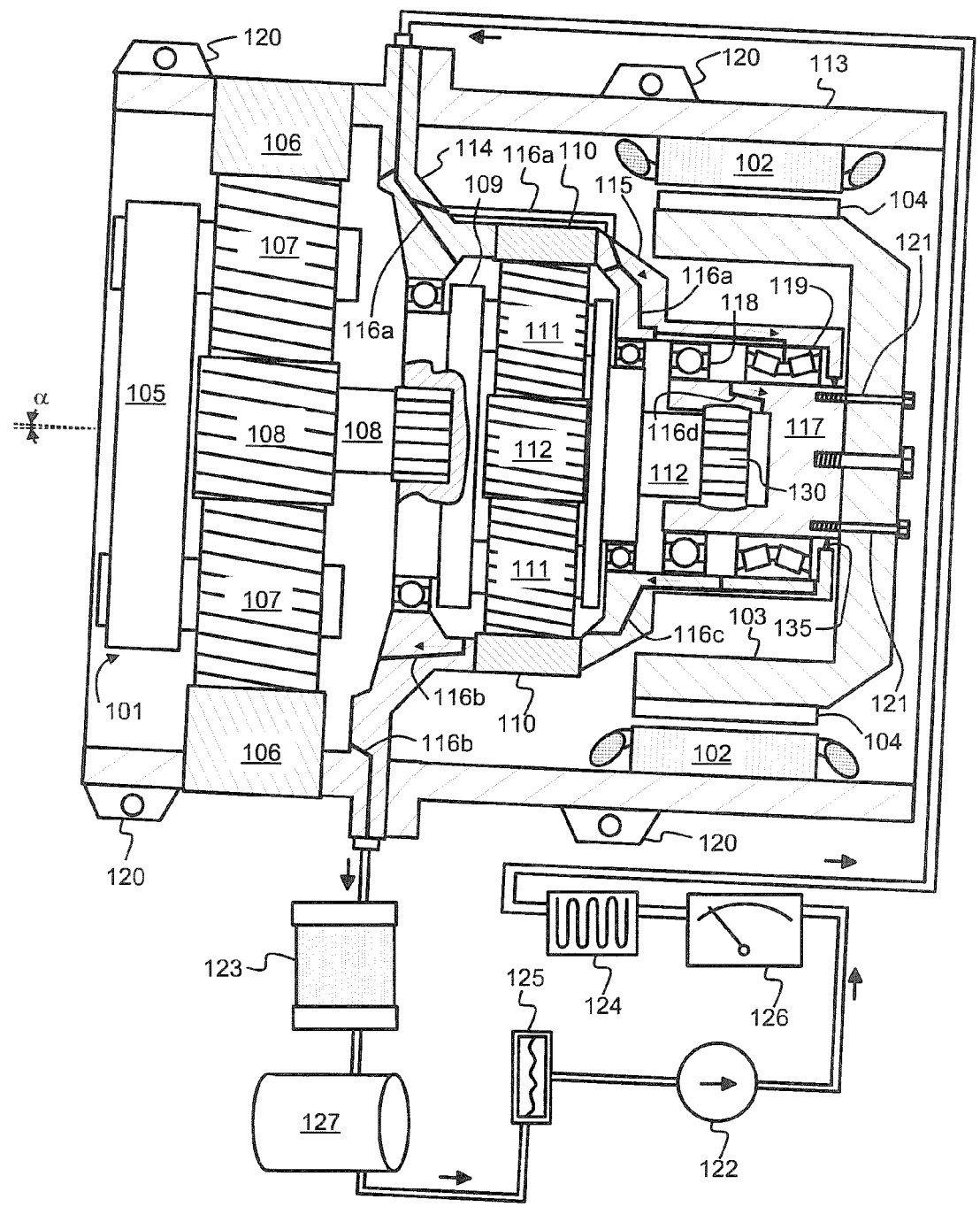
FIG. 3 shows a schematic section view of an electromechanical device according to an embodiment of the invention.

In many applications, an electromechanical device according to an embodiment of the invention is arranged to operate in a tilted position as illustrated in FIG. 3. The tilt angle α that is an angle between the axial direction of the electrical machine and a horizontal line can be, for example but not necessarily, on the range 4 . . . 6 degrees. The sun gear shaft 112 of the second planet-gear stage is connected with a coupling 130 to the central part 117 of the rotor of the electrical machine. The coupling 130 is advantageously cambered so as to allow certain misalignment between the rotational axes of the sun gear shaft 112 and the central part 117 of the rotor of the electrical machine. Thus, the coupling 130 can be arranged to remove the additional loading which would be otherwise caused by the possible misalignment to the bearings 118 and 119. Furthermore, the coupling 130 allows changes in the alignment during operation. The central part 117 of the rotor comprises an oil-channel 116*d* for delivering lubricant oil to the coupling 130. The coupling 130 is advantageously arranged to deliver the axial forces from the gear stages to the bearings 118 and 119 that are common to the gear stages and the electrical machine. The mechanical structure 115 comprises a return oil channel 116*c* that is arranged to ensure that the surface level of the lubricant oil within the mechanical structure 115 does not reach the lip seal 135 of the rotary lead-through when the electromechanical device is in the tilted position.

An electromechanical device according to an embodiment of the invention comprises an oil-pump 122 arranged to circulate the lubricant oil via the gear stages and via the bearings of the electrical machine. The electromechanical device may further comprise an oil tank 127.

An electromechanical device according to an embodiment of the invention comprises an oil cooler element 123 for cooling the lubricant oil circulating via the gear stages and the bearings of the electrical machine.

An electromechanical device according to an embodiment of the invention comprises a pre-heater element 124 for warming the lubricant oil circulating via the gear stages and via the bearings of the electrical machine.

An electromechanical device according to an embodiment of the invention comprises a filter element 125 for removing impurities from the lubricant oil.

An electromechanical device according to an embodiment of the invention comprises a sensor element 126 for monitoring the condition of the lubricant oil. The sensor element can be responsive, for example, to the temperature of the lubricant oil, the purity degree of the lubricant oil, and/or the water content of the lubricant oil.

FIGS. 1 and 2 illustrate electromechanical devices in which there are two gear stages. It should be noted that the number a gear stages is not necessarily two in electromechanical devices according to different embodiments of the invention. It is possible that, in an electromechanical device according to a certain embodiment of the invention, there is only one gear stage, e.g. a planet gear stage or a cylindrical gear stage, or that there are more than two gear stages each of which can be a planet gear stage or a cylindrical gear stage. Furthermore, concerning planet gear stages, it is not necessary that the planet-wheel carrier rotates and the gear ring is stationary as in the exemplifying constructions illustrated in FIGS. 1 and 2. It is also possible that the gear ring is rotated. It should be also noted that the present invention is not limited to the use of permanent magnet electrical machines. The electrical machine that is integrated with the gear system can be an electrically magnetized electrical machine as well.

The specific examples provided in the description given above should not be construed as limiting. Therefore, the invention is not limited merely to the embodiments described above.

What is claimed is:

1. An electromechanical device comprising:
   a mechanical interface structure for connecting to an external rotating element,
   an electrical machine,
   one or more gear stages on a mechanical power transmission path between the mechanical interface structure and a rotor of the electrical machine,
   a rotating coupling for transferring mechanical power between the electrical machine and the one or more gear stages and for allowing misalignment between rotational axes of the rotor of the electrical machine and a shaft of the one or more gear stages connected to the rotating coupling, the electrical machine comprising bearings on one side of the rotating coupling and the one or more gear stages comprising bearings on another side of the rotating coupling,
   oil channels for directing at least part of lubricant oil circulated in the electromechanical device to flow via the one or more gear stages and at least part of the lubricant oil to flow via the bearings of the electrical machine, and
   mechanical structures constituting a common lubricant oil room for both the at least part of the lubricant oil flowing via the one or more gear stages and the at least part of the lubricant oil flowing via the bearings of the electrical machine,
   wherein the bearings of the electrical machine comprise every one of the bearings supporting the rotor of the electrical machine.

2. An electromechanical device according claim 1, wherein the electromechanical device further comprises an oil-pump arranged to circulate at least part of the lubricant oil via the one or more gear stages and at least part of the lubricant oil via the bearings of the electrical machine.

3. An electromechanical device according to claim 1, wherein the electromechanical device further comprises an oil cooler element for cooling the part of the lubricant oil circulating via the one or more gear stages and the part of the lubricant oil circulating via the bearings of the electrical machine.

4. An electromechanical device according to claim 1, wherein the electromechanical device further comprises a pre-heater element for warming the part of the lubricant oil circulating via the one or more gear stages and the part of the lubricant oil circulating via the bearings of the electrical machine.

5. An electromechanical device according to claim 1, wherein the electromechanical device further comprises a filter element for removing impurities from the part of the lubricant oil circulating via the one or more gear stages and from the part of the lubricant oil circulating via the bearings of the electrical machine.

6. An electromechanical device according to claim 1, wherein the electromechanical device further comprises a sensor element for monitoring the part of the lubricant oil circulating via the one or more gear stages and the part of the lubricant oil circulating via the bearings of the electrical machine, the sensor element being responsive to at least one of the following: temperature of the lubricant oil, purity degree of the lubricant oil, water content of the lubricant oil.

7. An electromechanical device according to claim 1, wherein at least one of the one or more gear stages is a planet-gear stage.

8. An electromechanical device according to claim 7, wherein the sun gear shaft of the planet-gear stage is connected with the rotating coupling to the rotor of the electrical machine, the rotating coupling being cambered so as to allow misalignment between the rotational axes of the sun gear shaft and the rotor.

9. An electromechanical device according to claim 8, wherein the rotor comprises an oil-channel for delivering lubricant oil to the rotating coupling.

10. An electromechanical device according to claim 1, wherein the one or more gear stages consists of a first planet-gear stage and a second planet-gear stage, a planet-wheel carrier of the first planet-gear stage constituting a part of the mechanical interface structure, a sun gear shaft of the first planet-gear stage being connected to a planet-wheel carrier of the second planet-gear stage, and a sun gear shaft of the second planet-gear stage being connected to the rotor of the electrical machine.

11. An electromechanical device according to claim 10, wherein the electromechanical device comprises:
   connection elements on the outer surface of the electromechanical device for attaching to an external mechanical structure, a first mechanical structure supporting a stator of the electrical machine with respect to the connection elements, a second mechanical structure supporting a gear ring of the second planet-gear stage with respect to the connection elements, and a third mechanical structure supporting the rotor of the electrical machine with respect to the gear ring of the second planet-gear stage, the first and second mechanical structures being arranged to conduct tensions caused by electromagnetic forces acting on the stator of the electrical machine to the connection elements so that the tensions are arranged to bypass the third mechanical structure.

12. An electromechanical device according to claim 11, wherein the rotor of the electrical machine is connected to the sun gear shaft of the second planet-gear stage with a coupling arranged to lose its grip as a response to a situation in which torque acting over the coupling exceeds a pre-determined limit value.

13. An electromechanical device according to claim 12, wherein the coupling comprises friction surfaces pressed against each other and arranged to slip with respect to each other as a response to the situation in which the torque acting over the coupling exceeds a pre-determined limit value.

14. An electromechanical device according to claim 11, wherein the electromechanical device comprises a disc brake comprising a brake disc attached to the rotor of the electrical machine and a brake caliper attached to the first mechanical support structure.

15. An electromechanical device according to claim 10, wherein the sun gear shaft of the second planet-gear stage is floating on support of planet-wheels of the second planet-gear stage and on support of the rotor of the electrical machine.

16. An electromechanical device according to claim 11, wherein a frame of the rotor has a cupped shape opening towards the one or more gear stages and the third mechanical structure supporting the rotor of the electrical machine is arranged to extend to the semi-closed space defined by the cupped shape and the bearings of the electrical machine are located in the semi-closed space defined by the cupped shape.

17. An electromechanical device according to claim 15, wherein the sun gear shaft of the first planet-gear stage is floating on support of planet-wheels of the first planet-gear stage and on support of the planet-wheel carrier of the second planet-gear stage.

18. An electromechanical device according to claim 1, wherein the electromechanical device comprises a return oil channel arranged to ensure that surface level of the lubricant oil within the lubricant oil room does not reach a lip seal of a rotary lead-through when the electromechanical device is in a tilted position so that there is a non-zero acute angle between the axial direction of the electrical machine and a horizontal line.

19. An electromechanical device comprising:
a mechanical interface structure for connecting to an external rotating element,
an electrical machine,
one or more gear stages on a mechanical power transmission path between the mechanical interface structure and a rotor of the electrical machine,
a rotating coupling for transferring mechanical power between the electrical machine and the one or more gear stages and for allowing misalignment between rotational axes of the rotor of the electrical machine and a shaft of the one or more gear stages connected to the rotating coupling, the electrical machine comprising bearings on one side of the rotating coupling and the one or more gear stages comprising bearings on another side of the rotating coupling, oil channels for directing at least part of lubricant oil circulated in the electromechanical device to flow via the one or more gear stages and at least part of the lubricant oil to flow via the bearings of the electrical machine, mechanical structures constituting a common lubricant oil room for both the at least part of the lubricant oil flowing via the one or more gear stages and the at least part of the lubricant oil flowing via the bearings of the electrical machine, wherein the bearings of the electrical machine comprise every one of the bearings supporting the rotor of the electrical machine, wherein the one or more gear stages consists of a first planet-gear stage and a second planet-gear stage, a planet-wheel carrier of the first planet-gear stage constituting a part of the mechanical interface structure, a sun gear shaft of the first planet-gear stage being connected to a planet-wheel carrier of the second planet-gear stage, and a sun gear shaft of the second planet-gear stage being connected to the rotor of the electrical machine, wherein the electromechanical device comprises:
connection elements on the outer surface of the electromechanical device for attaching to an external mechanical structure,
a first mechanical structure supporting a stator of the electrical machine with respect to the connection elements,
a second mechanical structure gear of the second planet-gear stage with respect to the connection elements, and
a third mechanical structure supporting the rotor of the electrical machine with respect to the gear ring of the second planet-gear stage, the first and second mechanical structures being arranged to conduct tensions caused by electromagnetic forces acting on the stator of the electrical machine to the connection elements so that the tensions are arranged to bypass the third mechanical structure, wherein the rotor of the electrical machine is connected to the sun gear shaft of the second planet-gear stage with a coupling arranged to lose its grip as a response to a situation in which torque acting over the coupling exceeds a pre-determined limit value, and wherein the coupling comprises breaking-pins arranged to break as a response to the situation in which the torque acting over the coupling exceeds a pre-determined limit value.

20. An electromechanical device comprising:
a mechanical interface structure for connecting to an external rotating element,
an electrical machine,
one or more gear stages on a mechanical power transmission path between the mechanical interface structure and a rotor of the electrical machine,
a rotating coupling for transferring mechanical power between the electrical machine and the one or more gear stages, said rotating coupling including a cambered surface for allowing misalignment between rotational axes of the rotor of the electrical machine and a shaft of the one or more gear stages connected to the rotating coupling, the electrical machine comprising bearings on one side of the rotating coupling and the one or more gear stages comprising bearings on another side of the rotating coupling, oil channels for directing at least part of lubricant oil circulated in the electromechanical device to flow via the one or more gear stages and at least part of the lubricant oil to flow via the bearings of the electrical machine, and mechanical structures constituting a common lubricant oil room for both the at least part of the lubricant oil flowing via the one or more gear stages and the at least part of the lubricant oil flowing via the bearings of the electrical machine, wherein the bearings of the electrical machine comprise every one of the bearings supporting the rotor of the electrical machine.

* * * * *